United States Patent [19]

Gates

[11] 4,308,714
[45] Jan. 5, 1982

[54] THREE DRUM DEFOLIATOR

[75] Inventor: Donald C. Gates, Fargo, N. Dak.

[73] Assignee: Alloway Manufacturing, Inc., Fargo, N. Dak.

[21] Appl. No.: 52,756

[22] Filed: Jun. 28, 1979

[51] Int. Cl.³ .......................................... A01D 23/02
[52] U.S. Cl. ................................................ 56/121.43
[58] Field of Search ............. 56/121.4, 121.41, 121.42, 56/121.43, 121.44, 121.45, 121.46, 504, 505

[56] References Cited

U.S. PATENT DOCUMENTS

| | | | |
|---|---|---|---|
| 2,634,570 | 4/1953 | Brockman et al. | 56/504 |
| 3,008,526 | 11/1961 | Cohen | 172/45 |
| 3,031,833 | 5/1962 | Nelson | 56/238 |
| 3,060,667 | 10/1962 | Tonsfeldt | 56/121.43 |
| 3,529,412 | 9/1970 | Meiners | 56/504 |
| 3,583,136 | 6/1971 | Eisenhardt et al. | 56/121.43 |

Primary Examiner—Robert A. Hafer
Attorney, Agent, or Firm—Henderson & Sturm

[57] ABSTRACT

A machine for removing the top foliage of sugar beets having a frame with longitudinal side walls and a longitudinal center beam carrying three gear boxes. Rotor assemblies drivably connected to opposite sides of the gear boxes are rotatably mounted on the side walls. A PTO drive is connected to a main drive shaft located above the center beam. A chain and sprocket speed reducer surrounds the main beam and transmits power from the main drive shaft to drive shafts connected to the first and second gear boxes. The chain and sprocket speed reducer is located within a housing mounted on the main beam. The main beam extends through the housing. Each rotor has a cylindrical member carrying a splined sleeve that is mounted on a splined hub connected to an output shaft of a gear box. A bearing assembly mounts the outer end of each cylindrical member to a side wall. A plurality of flail carrying assemblies having flexible rubber flails are mounted on each cylindrical member. The first and second rotor assemblies are driven in the forward direction of movement of the machine. The third or last rotor assembly is driven in an opposite direction and functions to clear the foliage from the rows of beets and remove the foliage from the back side of the beets,. Ground engaging wheels are mounted on a transverse beam. Links pivotably mount the transverse beam to the side walls. Crank arms connected to a transverse shaft are controlled with a hydraulic motor to change the elevation of the machine relative to the ground engaging wheels thereby adjusting the working height of the flails.

41 Claims, 14 Drawing Figures

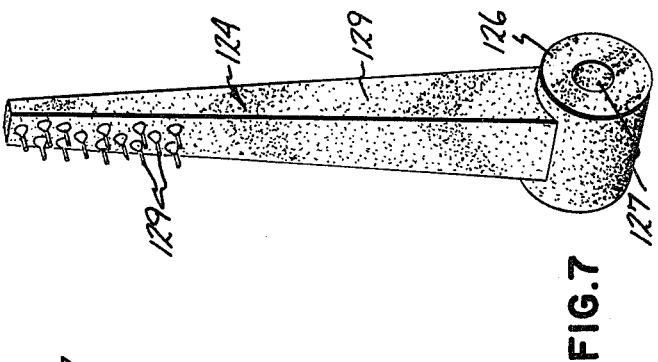
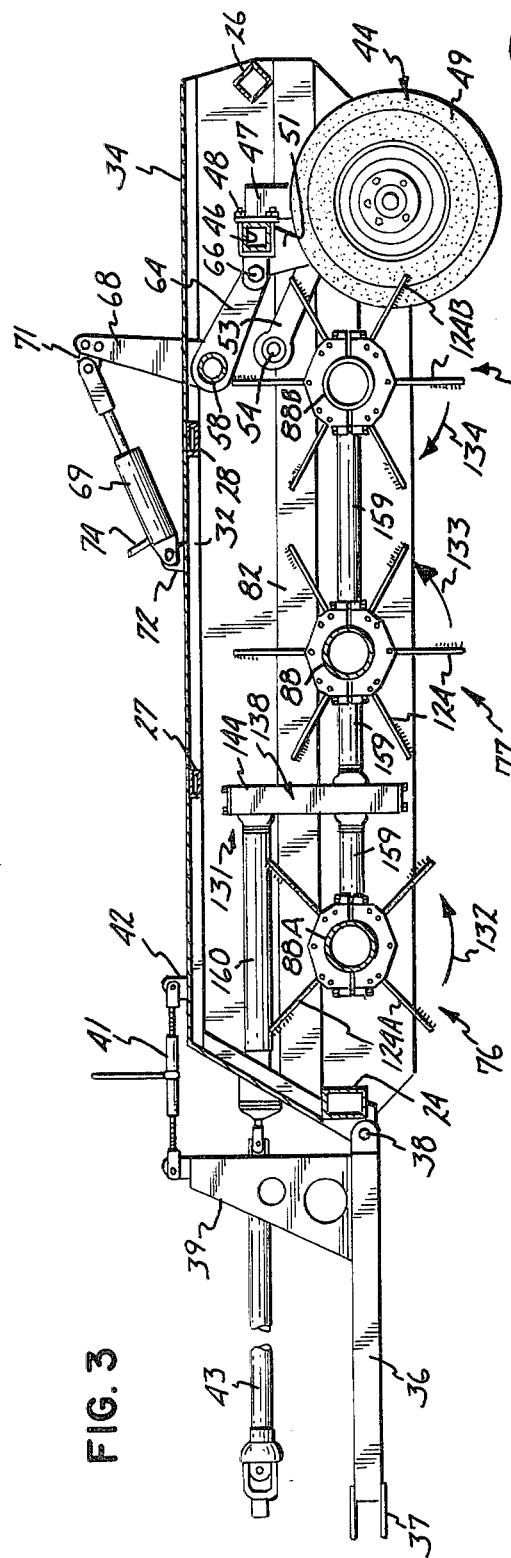
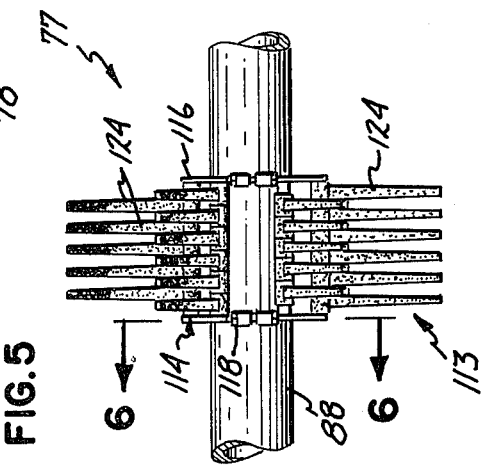
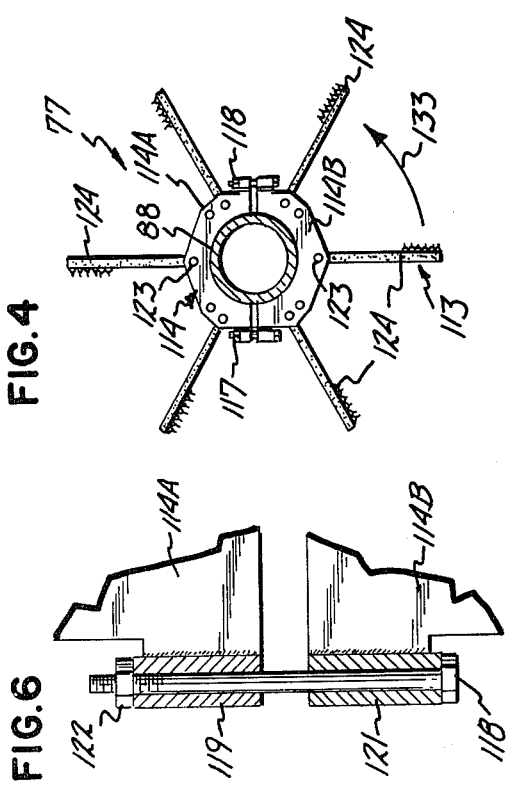

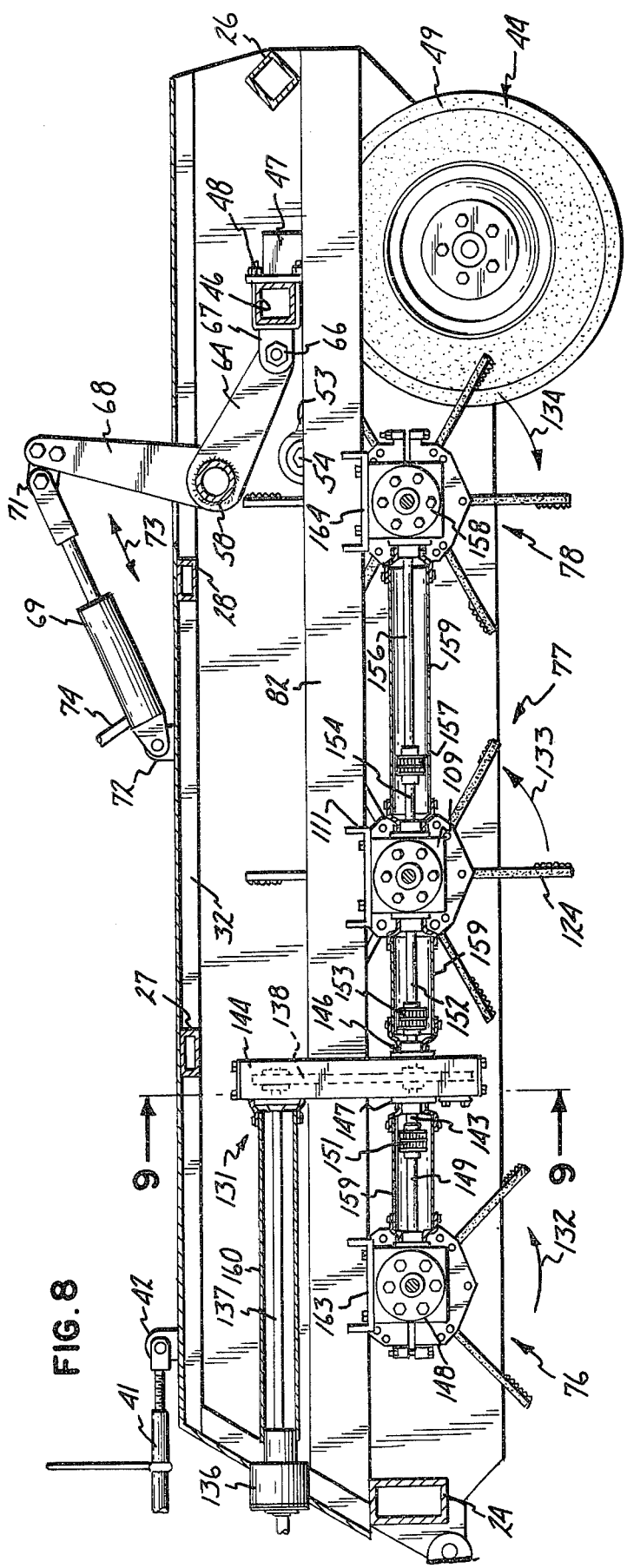
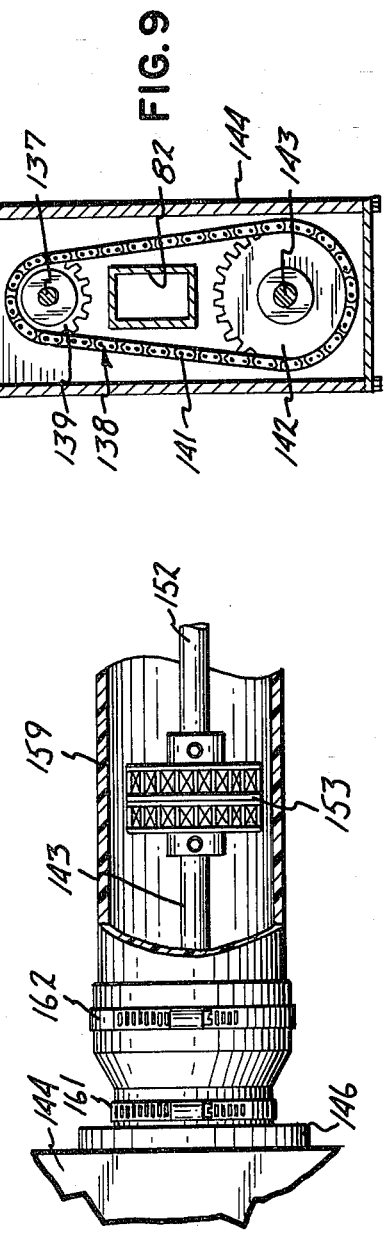
FIG. 8
FIG. 9
FIG. 10

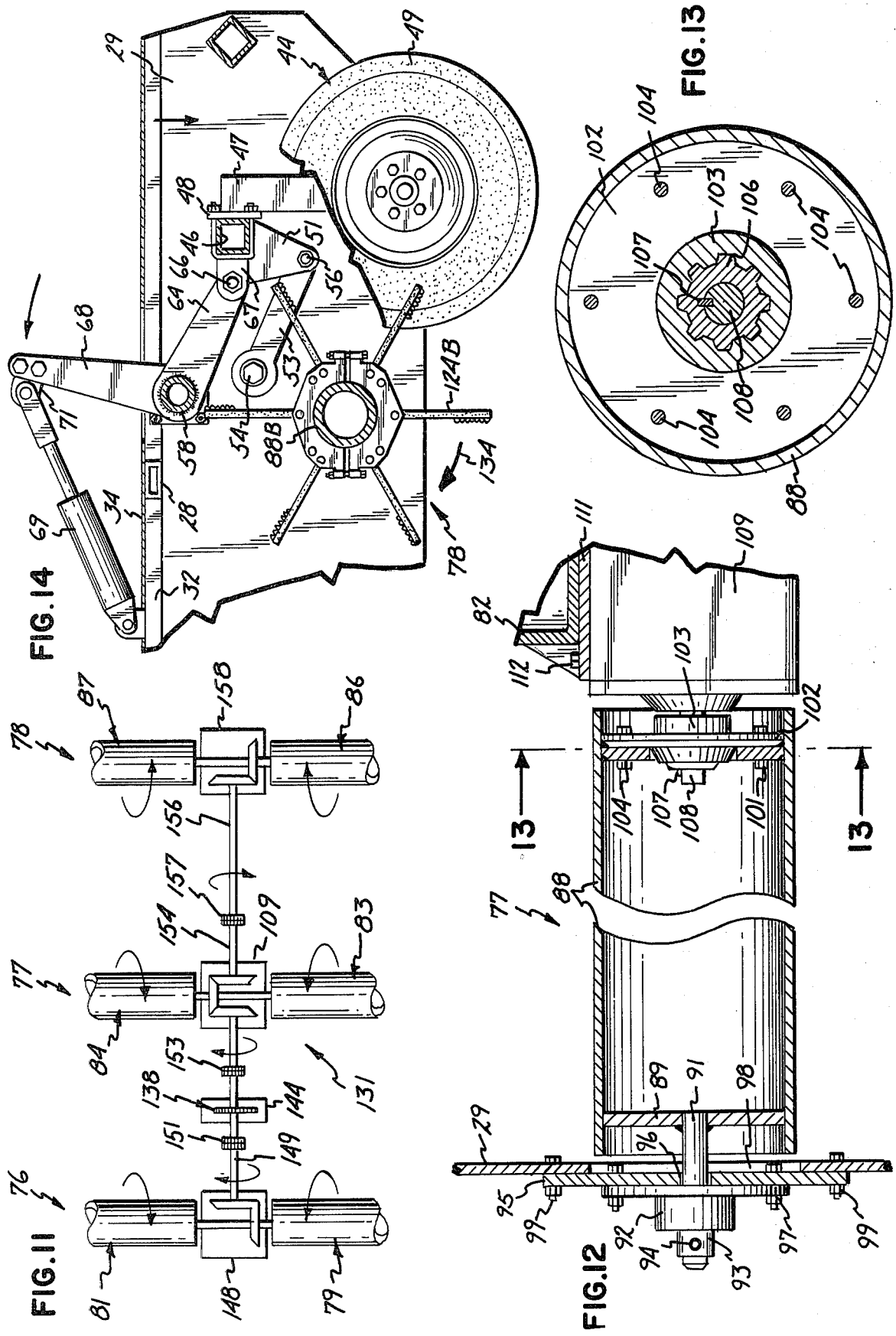

THREE DRUM DEFOLIATOR

SUMMARY OF INVENTION

The invention relates to a machine operable to cut crop foliage located in a field. The machine can remove foliage from root crops, as sugar beets, prior to the harvesting of the crop. The machine functions to remove beet tops from sugar beets, shred the tops, and clear the shredded tops from the rows of beets. The machine has a frame supported above the ground with ground engaging wheels and a hitch. The frame does not have transverse walls or beams which inhibit the movement of tops through the machine. Upright side walls are secured to opposite sides of the frame. The top of the machine is covered with flexible covers which can be moved to an open position to facilitate the servicing and repair of a plurality of rotor means located between the side walls. The machine has three rotors. Each rotor has a pair of rotor assemblies located on opposite sides of gear boxes secured to a longitudinal beam. Each rotor assembly carries a plurality of flexible flails. In operation, the rotor assemblies are rotated whereby the flails cut, beat, and shred the tops from the beets.

The side walls of the machine contain holes to facilitate the mounting of the rotor means. The rotor means and gear boxes carry cooperating splined members which mount and drivably connect the rotor means to the power output shafts of the gear boxes. The outer ends of the rotor means are rotatably mounted on bearings. The bearings are secured to plates attached to the side walls. The plates cover the holes in the side walls to protect the bearings against foreign materials. The power transmission means receives power from a power takeoff shaft and delivers the power to the gear boxes. The power transmission means includes a power input or main drive shaft located above the center beam. A speed reducer transmits the power from the power input shaft to the first and second gear boxes located below the longitudinal beam. The speed reducer has a housing secured to the center beam. The center beam extends through the housing. A chain and sprocket drive extends around the beam without cutting or changing the shape of the beam. Power is transmitted from the top of the beam to the bottom of the beam without cutting or drilling holes in the beam. The front gear box is independently driven from the speed reducer, as its requires about one-half of the power requirements of the machine. The second gear box is also connected in driving relation with a speed reducer to rotate the second rotor means in the same direction as the first rotor means. A drive shaft connects the second gear box with the third gear box to rotate the third rotor means in a direction that is opposite to the direction of rotation of the first and second rotor means. The flexible flails on the third rotor means function to clear the tops from the rows of beets and remove tops from the back side of the beets.

The operating level of the flails is controlled with adjustable support means for the ground engaging wheel means. The support means has a transverse beam connected to links pivotally attached to the side walls, a power cylinder operates to move the frame relative to the transverse beam to adjust the elevation of the frame and flails.

IN THE DRAWINGS

FIG. 3 is a sectional view taken along the line 3—3 of FIG. 2;

FIG. 4 is an enlarged sectional view taken along the line 4—4 of FIG. 2;

FIG. 5 is a front elevational view of FIG. 4;

FIG. 6 is an enlarged elevational view taken along the line 6—6 of FIG. 5;

FIG. 7 is an enlarged perspective view of a flexible flail used in the drums of the defoliator;

FIG. 8 is a sectional view taken along the line 8—8 of FIG. 2;

FIG. 9 is a sectional view taken along the line 9—9 of FIG. 8;

FIG. 10 is an enlarged plan view partly broken away to show the drive connection between the power transmission and the middle gear box;

FIG. 11 is a diagrammatic view of the drive transmission system for rotating the drums;

FIG. 12 is an enlarged foreshortened sectional view taken along the line 12—12 of FIG. 2;

FIG. 13 is a sectional view taken along the line 13—13 of FIG. 12; and

FIG. 14 is an enlarged sectional view taken along the line 14—14 of FIG. 2.

DESCRIPTION OF PREFERRED EMBODIMENT

Figure 1:
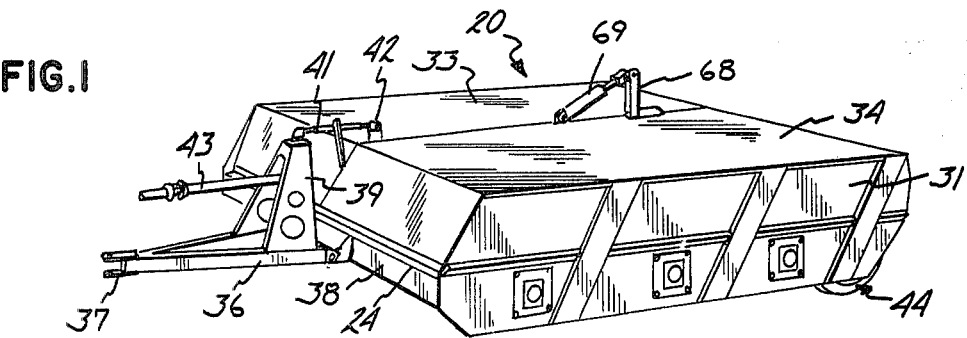
FIG. 1 is a perspective view of the three drum defoliator of the invention.
Figure 2:
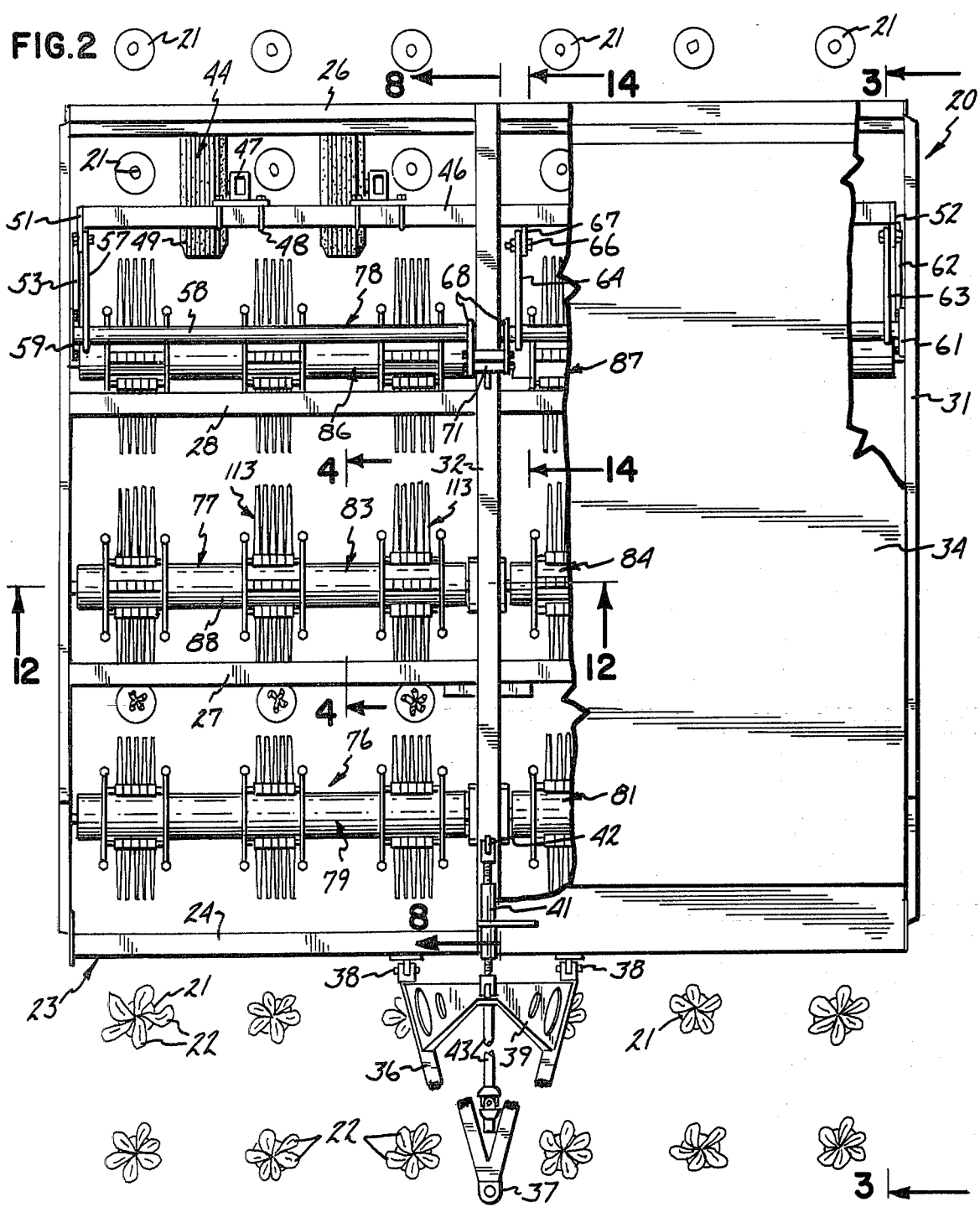
FIG. 2 is an enlarged top plan view of the defoliator of FIG. 1 with part of the top cover broken away to show the three drums.

Referring to FIGS. 1 and 2, there is shown a machine indicated generally at 20 for removing foliage from tubular plants, as sugar beets and the like. Machine 20 is known as a defoliator or roto-beeter adapted to be pulled by a tractor (not shown) along rows of sugar beets 21 to remove the tops 22 from the beets. Machine 20 simultaneously removes the beet tops 22 from six rows of sugar beets. Machine 20 is hereinafter described as operable to remove the tops of sugar beets. The machine is useable for a variety of foliage removing and cutting purposes, including, but not limited to, the removal of potato vines and the breaking of heavy stubble, corn stalks, or other plant growth into finely divided material to be left on the ground as mulch.

Machine 20 has a frame indicated generally at 23. Frame 23 comprises a front transverse beam 24 and a rear transverse beam 26. A pair of top cross beams 27 and 28 extend between and are attached to side walls 29 and 31 extending along opposite sides of the machine and attached to the front and rear beams 24 and 26. A top center longitudinal beam 32 extends along the mid-portion of the machine from the front beam 24 to the rear beam 26. A pair of flexible covers or sheet members 33 and 34 extended over beams 27 and 28 cover the top of the machine. Covers 33 and 34 are releasably attached at one end thereof to frame 23 so that they can be moved to an open position to facilitate the servicing of the drums or beaters located under the covers.

A triangular tongue 36 having a forward hitch 37 is pivotally connected to the mid-portion of front beam 24 with a pair of pivot members 38. Tongue 36 is secured to an upwardly directed arm 39. The upper end of arm 39 is connected to a longitudinally adjustable link 41. Link 41 is also connected to an upright ear 42 secured to the forward end of beam 32. The length of link 41 can be adjusted to regulate the working height of the front of machine 20. A PTO drive shaft 43 extended through arm 39 is operatively connected to the power transmission system for the drums, as hereinafter described.

Referring to FIGS. 2, 3, 8, and 14, a plurality of wheel assemblies indicated generally at 44 support the rear of frame 23 above the ground. The wheel assemblies 44 are connected to a transverse member or beam 46 and are located along the length of beam 46 so that the wheels are located between adjacent rows of beets. Each wheel assembly 44 has an upright standard 47 connected to beam 46 with a clamp structure 48, such as U-bolts. A wheel containing a tire 49 is rotatably mounted on the lower end of standard 47. Other types of wheels, as tandem wheels mounted on a rocking shaft, can be attached to beam 46.

Plates 51 and 52 are secured to opposite ends of the beam 46. Plate 51 is located adjacent the inside of side wall 29. A lower link 53 is pivotally mounted on side wall 29 by pivot bolt 54 and is pivotally connected with a pivot 56 to a lower portion of plate 51. An upper link 57 secured or fixed to a shaft or tubular member 58 is pivotally connected to an upper portion of plate 51. Bearings 59 and 61 rotatably mount the opposite ends of member 58 to the side walls 29 and 31, respectively. A lower link 62 pivotally connects plate 52 to side wall 31. An upper link 63 pivotally connects plate 62 to the right end of member 58, as seen in FIG. 2. Link 63 is secured to member 58 so that both links 57 and 63 are crank arms fixed to member 58. A middle link 64 is secured to the center portion of member 58. As seen in FIGS. 8 and 14, middle link 64 extends downwardly toward beam 46 and is pivotally connected thereto with a pivot member 66. A forwardly directed ear 67 carries pivot member 66 and is secured to beam 46.

A pair of upwardly directed arms 68 are fixed to the center portion of member 58. As shown in FIG. 2, arms 68 extend upwardly adajcent the opposite sides of center beam 32 and are connected at their upper ends to a hydraulic cylinder 69. A connector 71 pivotally connects the rod end of cylinder 69 to the upper ends of arms 68. The cylinder end of cylinder 69 is pivotally connected to a mount 72 secured to beam 32. Hydraulic cylinder 69 functions to pivot arms 68 in the direction of the arrow 73 thereby changing the elevation of the rear portion of machine 20 to adjust the working height of the foliage removing drums. When the hydraulic cylinder 69 is in its fully extended position, as shown in FIGS. 8 and 14, the machine is in the raised or transport position. Hydraulic cylinder 69 is connected with suitable lines or hoses 74 to the hydraulic system of the towing vehicle or other source of hydraulic fluid under pressure.

Three foliage removing drums or rotors indicated generally at 76, 77, and 78 are located between side walls 31 and 32. Each rotor is a beater or drum adapted to cut and shred the foliage or tops from the beets. First rotor 76 comprises a pair of rotor assemblies 79 and 81 located adjacent opposite sides of a main central beam 82. The inside or adjacent ends of rotor assemblies 79 and 81 are directed toward the longitudinal center line of the machine. Beam 82 is located below and is parallel to the top center beam 32. The front end of beam 82 is connected to the front beam 24. The rear end of beam 82 is connected to the rear beam 26.

Second rotor 77 has a pair of rotor assemblies 83 and 84 located on opposite sides of beam 82. A third rotor 78 has a pair of rotor assemblies 86 and 87 located on opposite sides of main beam 82. Rotor assemblies 79, 83, and 86 and 81, 84, and 87 extend generally parallel to each other and are located in the same general horizontal plane along the length of the machine 20. Rotor assemblies 79, 81, 83, 84, 86, and 87 are generally identical in structure. The following description is limited to rotor assembly 83, as shown in detail in FIGS. 4–6 and 12.

Referring to FIGS. 12 and 13, rotor assembly 83 has an elongated cylinder or tube 88 extended from side wall 29 toward center beam 82. A cylindrical plate 89 secured to the outer end of tube 88 carries an outwardly projected axle 91. Axle 91 is rotatably supported in a bearing 92 having an inner race 93. Inner race 93 is attached to axle 91 with a set screw 94. The inner race of bearing 92 can be held on the axle 91 with a locking collar. The locking collar accommodates the side thrust of tube 88. Bearing 92 is mounted on a plate 95 with a plurality of nut and bolt assemblies 97. Plate 95 has a small central hole 96 for accommodating axle 91 and protecting bearing 92. A plurality of bolts 99 secure the plate 95 to side wall 29.

Side wall 29 has a large hole 98 which allows tube 88 to be moved through the side wall and slipped onto a splined hub 106 carried on an output shaft 108 of a gear box 109. As shown in FIG. 12, an annular member or ring 101 is secured to the inner end of tube 88. A plate 102 carrying a splined collar 103 is attached to ring 101 with a plurality of nut and bolt assemblies 104. A key 107 attaches splined hub 106 to output shaft 108 of a gear box 109. The splined collar 103 is located in driving relation with the splined hub 107. Gear box 109 is supported on a plate 101 and attached thereto with a plurality of bolts 112.

Tube 88 is mounted in driving relation with respect to output shaft 108 of gear box 109 by inserting the tube through hole 98 and mounting collar 103 on splined hub 106. Plate 95 is then attached to side wall 29. Bearing 92 is mounted on axle 91 and attached to plate 95. Bearing 92 holds collar 103 in mounting and driving relation on hub 106.

As shown in FIG. 2, a plurality of flail assemblies indicated generally at 113 are mounted on tube 88. Three flail assemblies 113 are shown on tube 88 in alignment with the three rows of beets 21. Referring to FIG. 5, flail assembly 113 has a pair of clamp units 114 and 116 located about and clamped onto tube 88. FIG. 4 shows clamp unit 114 as comprising a top C-shaped member 114A and a bottom C-shaped member 114B. Bolts 117 and 118 clamp the members 114A and 114B onto tube 88. Clamp unit 116 has a similar construction. As shown in FIG. 6, the upper member 114A has a sleeve 119 aligned with a sleeve 121 on the lower member 114B. Bolt 118 extends through sleeves 119 and 121. Nut 122 threaded onto bolt 118 clamps the members 114A and 114B toward each other onto tube 88. The opposite end of members 114A and 114B have similar sleeves that accommodate bolt 117.

A plurality of rods 123 are secured to and extend between clamp units 114 and 116. Flexible flails are mounted on rods 123. As shown in FIG. 4, six groups of flails 124 are pivotally mounted on rods carried by clamp units 114 and 116. The number of flails 124 in each group can vary. Preferably, every other group of flails 124 has a different number of flails. For example, one group can have six flails, while the next group has five flails.

Referring to FIG. 7, flail 124 has a cylindrical base 126 having a hole 127 to accommodate a portion of a rod 123. An elongated flexible arm 128 extends radially from base 126. The base 126 has four sides that converge or taper to the outer end thereof. The forward side has a plurality of fingers or projections 129 that facilitate the cutting, shredding, and rubbing of the tops from the beets. Flail 124 is an elongated one-piece or solid rubber member. The flail member is flexible or elastic. In use, the flail can move or flex around the top of the beet to beat and scrub the top of the beet and remove foliage therefrom.

As shown in FIGS. 3, 8, and 11, a power transmission structure indicated generally at 131 drivably connects PTO shaft 43 with each of the rotor assemblies to rotate the rotor assemblies in the direction of the arrows 132, 133, and 134.

The front of the machine behind arm 39 has a bearing unit 136 adapted to be connected with a suitable universal joint to PTO drive shaft 43. A shaft 137 extended rearwardly from bearing unit 136 is drivably connected to a speed reducer or chain and sprocket drive 138. Drive 138, as shown in FIG. 9, has a first sprocket 139 drivably mounted on shaft 137. An endless link chain 141 extends over sprocket 139 and around a second sprocket 142. Sprocket 142 is secured to a shaft 143. Shaft 143 is mounted on a housing 144 with bearings 146 and 147. Housing 144 has side walls containing holes for accommodating main beam 82. Chain 141 located within housing 144 extends around beam 82. The power of shaft 137 is transmitted with the chain and sprocket drive 138 from the top of main beam 82 to the bottom of main beam 82 without cutting or drilling holes in main beam 82. Shaft 143 is connected to the front or first gear box 148 with a shaft 149 and a chain coupling 151. Gear box 148 is mounted on a plate 143 secured to the bottom of main beam 82. Shaft 143 is also connected to the center box 109 with a shaft 152 and coupling 153. Center gear box 109 has an output shaft 154 connected to a shaft 156 with a coupling 157. Shaft 156 drives the third or rear gear box 158. Gear box 158 is mounted on a plate 164 secured to the bottom of main beam 82.

Gear boxes 148, 109, and 158 are operable to rotate the first, second, and third rotors 76, 77, and 78 in the direction of the arrows 132, 133, and 134, respectively. The first rotor 76 rotates in the direction of the movement of the machine at about 400 rpm when the PTO is driven at 1000 rpm. The flexible rubber flails 124 remove the tops from both the high and the low beets without cutting the beet tops or upper parts of the high beets. The conventional topping machines have the first drum carrying metal flails. The metal flails may cut the upper parts of the beets. Also, metal flails require greater speed and power to rotate the rotor. The second rotor 77 rotates in the same direction as the first rotor 76. The rotors 76 and 77, by rotating with the direction of forward movement of the machine 20, make up for the forward or ground speed of the machine. The second rotor rotates at about 400 rpm.

The third rotor 78 rotates in the reverse direction, as indicated by arrow 134. Flexible flails 124 remove the material from the back side of the high and low beets and kick the material back into the machine. The material moves from the back of the machine between the rows of beets.

The PTO shaft 43 is located above the main center beam 82 and is connected to the towing vehicle. It operates at about 1000 rpm. The chain and sprocket drive 138 is a speed reducer. It connects the power input shaft 137 to the output shaft 143 in a manner to reduce the speed to about 400 rpm. The front gear box 148 is independently driven from the chain and sprocket drive 138. About one-half of the power requirements of the machine is used by the front rotor 76. Rotors 77 and 78 consume and each have approximately the same power requirements and consume the remaining one-half of the power requirements of the machine.

The shaft between the gear boxes 148, 149, and 109 and 159 are enclosed within elongated linear tubular covers 159. A similar cover 160 encloses the input shaft 137. As shown in FIG. 10, clamp structures 161 and 162 mount the cover 159 on a portion of the bearing 146. Similar clamps mount the ends of the covers 159 to support structures on the gear boxes.

In use, machine 20 is connected to the power takeoff drive of the towing vehicle with the power takeoff shaft 43. The hitch 37 is connected to the drawbar of the towing vehicle. The front of the machine 20 is leveled with the ground by adjusting the length of link 41. The machine 20 in the operating position locates the ends of the flexible flails 124 in close proximity to the ground. The lift and leveling cylinder 69 operates to locate the rear portion of the machine in its operating position. In this position, the ends of the flails 124 in the second and third rotors are located in close proximity to the ground. The power takeoff shaft transmits power to the drive shaft 137. The drive shaft 137 is connected to the speed reducer 138 which transmits the power to the shaft 143. The speed reducer drives the front gear box 148 and center gear box 109. The power is transmitted through the center gear box 109 to a shaft which drives the rear gear box 158. The rotor assembly is attached to the rear gear box 158 and is driven in a counter-clockwise or in a direction against the forward movement of the machine. The reverse rotation of the third rotor means allows the rear flexible flails 124 to clean up the back sides of the beets and remove the cut and shredded tops from the rows of the beets. The tops are moved between the rows of beets by the action of the flails 124 on the third rotor means. The machine 20 can be raised at the end of the field or for transporting purposes by raising the tractor hitch or the cylinder 69 which controls the elevation of the frame relative to the ground engaging wheels.

While there has been shown and described the preferred embodiment of the machine for removing foliage from crops, as a root crop, sugar beets, and the like, it is understood that changes in the structure, arrangement of structure, size of the structure, and materials can be made by those skilled in the art without departing from the invention. The invention is defined in the following claims.

The embodiments of the invention in which an exclusive property or privilege is claimed are defined as follows:

1. A machine for removing foliage from a root crop, such as sugar beets, comprising: a frame having side walls located along opposite sides of the machine, ground engaging wheel means connected to the frame to support the frame above the ground, first rotor means extended from each side wall toward the longitudinal center of the machine, means rotatably mounting the first rotor means on each side wall, a first gear box secured to the frame and drivably connected to the second rotor means, third rotor means extended from each side wall toward the longitudinal center of the machine, means rotatably mounting the third rotor means on each side wall, a third gear box secured to the frame and drivably connected to the third rotor means, each of said rotor means having foliage removing members operable to remove the foliage from the root crop during rotation of the rotor means, and power transmission means connected to the first, second, and third gear boxes operable to rotate each of said rotor means, said power transmission means including a main drive shaft, and first drive means connecting the main drive shaft to the first and second gear boxes, and second drive means connecting the second gear box to the third gear box.

2. The machine of claim 1 wherein: said frame has a longitudinal center beam, and means mounting each of said first, second, and third gear boxes on the longitudinal center beam.

3. The machine of claim 2 wherein: said first and second gear boxes are operable to rotate the first and second rotor means in a direction such that the lowermost portion thereof of the first and second rotor means moves in the forward direction of movement of the machine and said third gear box is operable to rotate the third rotor means in a direction opposite the direction of the first and second rotors.

4. The machine of claim 1 including means for causing said first and second rotor means to rotate in such a direction that the lowermost portions thereof move in the forward direction of movement of the machine and the third rotor means to rotate in a direction opposite to the first and second rotor means, said first and second rotor means being disposed in front of the third rotor means.

5. The machine of claim 1 wherein: said frame includes a longitudinal center beam, a housing mounted on the center beam surrounding said first drive means, said center beam extended through said housing, said first drive means located in the housing and extended around the center beam, said first drive means having power output means connected to the first and second gear boxes.

6. The machine of claim 1 wherein: the first and second gear boxes rotate the first an second rotor means in a direction such that the lowermost portion thereof of the first and second rotor means moves in the forward direction of movement of the machine, said third gear box rotating the third rotor means in the direction opposite the direction of the first and second rotors.

7. The machine of claim 6 wherein: each of said foliage removing members is a flexible rubber flail.

8. The machine of claim 1 including: transverse means extended between said side walls, means mounting the wheel means on the transverse means, first means pivotally connecting one end of the transverse means to one side wall, second means pivotally connecting the other end of the transverse means to the other side wall, and power means connected to the frame and transverse means operable to move the transverse means to selectively raise and lower the frame relative to the ground.

9. The machine of claim 8 including: a transverse shaft extending between and rotatably mounted on the side walls, link means connecting the shaft to the transverse means, and means connecting the shaft to the power means whereby the power means is operable to rotate the shaft thereby moving the transverse means.

10. The machine of claim 9 wherein: the power means is a hydraulic cylinder.

11. The machine of claim 9 wherein: the first and second means are each links located generally parallel to said link means.

12. The machine of claim 1 wherein: each gear box has power output shaft means, each rotor means has an elongated cylindrical member, cooperating spline means mounting the cylindrical member on a power output shaft means of a gear box, each side wall having a hole allowing the cylindrical member to be moved through the side wall so that the cylindrical member can be connected to a power output shaft means, and bearing means rotatably mounting the cylindrical member on the side wall located adjacent the cylindrical member.

13. The machine of claim 12 including: plate means covering the hole in the side wall, means attaching the plate means to said side wall, and means attaching the bearing means to the plate means.

14. The machine of claim 12 including: means mounting the foliage removing members on the cylindrical member after the cylindrical member has been moved through a hole in the side wall.

15. The machine of claim 12 wherein: said frame includes a longitudinal center beam, and means mounting each of said gear boxes to said center beam.

16. The machine of claim 1 including flexible top means attached to the top of said frame for preventing the cut foliage from sticking thereto by the flexing action of said flexible top means induced by the rotation of the flail means and movement of the machine in a forward position.

17. A machine for cutting crop foliage comprising: a frame having side walls along opposite sides of the machine, ground engaging wheel means connected to the frame to support the frame above the ground, first rotor means extended from each side wall toward the longitudinal center of the frame, means mounting the first rotor means on each side wall, a first gear box secured to a mid-section of the frame and drivably connected to the first rotor means, second rotor means extended from each side wall toward the longitudinal center of the beam, means mounting the second rotor means on each side wall, second gear box secured to a mid-section of the frame and drivably connected to the second rotor means, each of said rotor means having foliage cutting members operable to remove foliage from the crop during rotation of the rotor means, and power transmission means separately connected to the first and second gear boxes operable to rotate said rotor means whereby the foliage cutting members cut foliage, each gear box having power output shaft means, each rotor means having an elongated cylindrical member, cooperating spline means mounting the cylindrical member on a power output shaft means of a gear box, each side wall having a hole allowing the cylindrical member to be moved through the side wall so that the cylindrical member can be connected to a power output shaft means, and bearing means rotatably mounting the cylindrical member on the side wall located adjacent the cylindrical member.

18. The machine of claim 17 wherein: said frame includes a longitudinal center beam, and means mounting said first and second gear boxes on the longitudinal center beam.

19. The machine of claim 18 wherein: the power transmission means is operable to rotate the first and second rotor means in the same direction.

20. The machine of claim 19 wherein: the power transmission means includes a main drive shaft, and drive means connecting the main drive shaft to the first and second gear boxes.

21. The machine of claim 20 including: a housing mounted on the center beam, said center beam extended through said housing, said drive means located in said housing and extended around the center beam.

22. The machine of claim 20 wherein: the drive means is a speed reducing drive.

23. The machine of claim 17 wherein: the first and second gear boxes rotate the first and second rotor means in a direction such that the lowermost portion thereof of the first and second rotor means moves in the forward direction of movement of the machine.

24. The machine of claim 17 wherein: said foliage cutting members include a plurality of flexible rubber flails.

25. The machine of claim 17 including: transverse means extended between said side walls, means mounting the wheel means on the transverse means, first means pivotally connecting one end of the transverse means to one side wall, second means pivotally connecting the other end of the transverse means to the other side wall, and power means connected to the frame and transverse means operable to move the transverse means to selectively raise and lower the frame relative to the ground.

26. The machine of claim 25 including: a transverse shaft extending between and rotatably mounted on the side walls, link means connecting the shaft to the transverse means, and means connecting the shaft to the power means whereby the power means is operable to rotate the shaft thereby moving the transverse means.

27. The machine of claim 26 wherein: the power means is a hydraulic cylinder.

28. The machine of claim 26 wherein: the first and second means are each links located generally parallel to said link means.

29. The machine of claim 17 including: plate means covering the hole in the side wall, means attaching the plate means to said side wall, and means attaching the bearing means to the plate means.

30. The machine of claim 17 including: means mounting the foliage removing members on the cylindrical member after the cylindrical member has been moved through a hole in the side wall.

31. The machine of claim 17 wherein: said frame includes a longitudinal center beam, and means mounting each of said gear boxes to said center beam.

32. A machine for cutting crop foliage comprising: a frame having side walls along opposite sides of the machine, ground engaging wheel means connected to the frame to support the frame above the ground, rotor means extended from each side wall toward the longitudinal center of the frame, means mounting the rotor means on each side wall, said frame having a longitudinal center beam, gear box means secured to the longitudinal center beam and drivably connected to the rotor means, said gear box means having power output shaft means, said rotor means comprising a first rotor assembly and a second rotor assembly located on opposite sides of the gear box means, each rotor assembly having an elongated cylindrical member and cooperating spline means on the cylindrical member and power output shaft means to mount and drivably connect the cylindrical member to the power output shaft means, each side wall having a hole allowing the cylindrical member of each rotor assembly to be moved through the side wall so that the cylindrical member can be connected to the power output shaft means of the gear box means, said means mounting the rotor means on the side wall including bearing means rotatably mounting the cylindrical member on the side wall located adjacent the cylindrical member, said first and second rotor assemblies having foliage cutting members, and power transmission means connected to the gear box operable to rotate said rotor means whereby the foliage cutting members cut foliage that engages the members.

33. The machine of claim 32 wherein: the power transmission means includes a main drive shaft, and drive means connecting the main drive shaft to the gear box means.

34. The machine of claim 33 including: a housing mounted on the center beam, said center beam extended through said housing, said drive means located in said housing and extended around the center beam.

35. The machine of claim 34 wherein: the said drive means is a speed reducing drive.

36. The machine of claim 32 including: plate means covering the hole in the side wall, means attaching the plate means to said side wall, and means attaching the bearing means to the plate means.

37. The machine of claim 32 including: means mounting the foliage cutting members on the cylindrical member after the cylindrical member has been moved through a hole in the side wall.

38. The machine of claim 32 wherein: said cooperating splined means comprises a hub having external splines mounted on the power output shaft means and a sleeve having internal splines mounted to the cylindrical member, said external splines of the hub being located in driving engagement with the internal splines on the sleeve when the cylindrical member is mounted on the power output shaft means.

39. A machine adapted to be moved forwardly for removing foliage from a root crop, such as sugar beets, comprising:
a frame;
means connected to the frame for supporting the frame above the ground;
a first rotor rotatably attached along a first axis to said frame, and first axis being disposed generally transversely with respect to the forward direction of movement of the machine;
a second rotor rotatably attached along a second axis to said frame behind said first rotor, said second axis being generally transversely disposed with respect to the forward direction of movement and the machine;
first and second resilient flail means being attached to said first and second rotors respectively for removing foliage from crops;
first means for rotating said first rotor and thereby the first resilient flail means at a substantially constant speed in a first direction such that the lowermost portion of said first resilient flail means moves in the same direction as the forward direction of movement of the frame whereby the first flail means breaks off foliage from the crops, from front to back, and throws such foliage rearwardly toward the second flail means;
second means for rotating said second rotor and thereby said second flail means at approximately said substantially constant speed in a rotational direction opposite to the rotational direction of the first rotor whereby the second flail means breaks off further foliage from said crops, from rear to front, and throws such further foliage and the foliage from said first flail means forwardly thereby causing substantially all of the foliage to windrow before exiting the rear of the machine; and cover means attached to said frame for preventing cut foliage from exiting out the top of said machine, said cover means being flexible to such a degree that said flexing of said flexible cover means prevents cut foliage from sticking thereto, whereby said flexible flails operate in combination with said flexible cover means to prevent said cover from being damaged.

40. A machine adapted to be moved forwardly for removing foliage from a root crop, such as sugar beets, comprising:

a frame;

means connected to the frame for supporting the frame above the ground;

a first rotor rotatably attached along a first axis to said frame, said first axis being disposed generally transversely with respect to the forward direction of movement of the machine;

a second rotor rotatably attached along a second axis to said frame behind said first rotor, said second axis being generally transversely disposed with respect to the forward direction of movement of the machine;

a third rotor rotatably attached along a third axis to said frame behind said second rotor, said third axis being generally transversely disposed with respect to the forward direction of movement of the machine;

first, second and third resilient flail means attached to said first, second and third rotors respectively for removing foliage from crops;

first means for rotating said first rotor and thereby the first flail means at a substantially constant speed in a first direction such that the lowermost portion of said first flail means moves in the same direction as the forward direction of movement of the frame whereby the first flail means breaks off foliage from the crops, from front to back, and throws such foliage rearwardly toward the second flail means;

second means for rotating the second rotor and thereby the second flail means at approximately said substantially constant speed in the same direction as the rotational direction of said first rotor whereby the second flail means breaks off additional foliage from the crops, from front to back, and throws the additional foliage and the foliage from the first flail means rearwardly to the third flail means;

third means for rotating said third rotor and thereby said third flail means at approximately said substantially constant speed in a rotational direction opposite to the rotational direction of the first and second rotors whereby the third flail means breaks off further foliage from said crops, from rear to front, and throws such further foliage and the foliage from said second flail means forwardly thereby causing substantially all of the foliage to windrow before exiting the rear of the machine; and cover means attached to said frame for preventing cut foliage from exiting out the top of said machine, said cover means being flexible to such a degree that said flexing of said flexible cover means prevents cut foliage from sticking thereto, whereby said flexible flails operate in combination with said flexible cover means to prevent said cover from being damaged.

41. The apparatus of claim 40 wherein said first flail means includes a plurality of evenly spaced-apart groups of resilient flails along the length thereof whereby flails will be disposed only over rows of crops.

* * * * *